United States Patent [19]

Nielson

[11] 4,104,637

[45] Aug. 1, 1978

[54] VOR PHASE MONITORING SYSTEM

[75] Inventor: David R. Nielson, Sandy, Utah

[73] Assignee: E-Systems, Inc., Dallas, Tex.

[21] Appl. No.: 735,947

[22] Filed: Oct. 27, 1976

[51] Int. Cl.² .......................... G01S 1/44; H04B 1/06
[52] U.S. Cl. ............................... 343/106 R; 325/363; 325/364
[58] Field of Search .................... 343/106 R; 325/363, 325/364

[56] References Cited

U.S. PATENT DOCUMENTS

| 3,745,465 | 7/1973 | Stover | 343/106 R |
| 4,017,861 | 4/1977 | Wimmer et al. | 343/106 R |

Primary Examiner—Maynard R. Wilbur
Assistant Examiner—Richard E. Berger
Attorney, Agent, or Firm—Robert V. Wilder

[57] ABSTRACT

A VOR monitoring system responds to the phase difference between two signals to determine the bearing of an aircraft with reference to a transmitting station. Even harmonic distortion interference in the monitored signals produces a bearing error and when the bearing error exceeds a preset limit the monitor of the present invention energizes an alarm. The two monitored signals are identified as a 30 Hz reference and 30 Hz variable signal, each of which is doubled in frequency to 60 Hz and divided by three to produce two 20 Hz signals. One of the 20 Hz signals is identified as a positive error signal and the second as a negative error signal. The negative error signal is phase delayed through a programmable delay by an amount related to the bearing of an aircraft with respect to a transmitting field station. The two error signals are then phase compared and the difference tested against a preset bearing error limit. When the phase difference between the two error signals exceeds the bearing error limit the alarm is energized.

13 Claims, 8 Drawing Figures

VOR PHASE MONITORING SYSTEM

This invention relates to a monitor of a radio navigation receiver, and in particular to a phase error monitor for a VOR navigation system.

A standard en route navigational aid for aircraft used throughout the world is identified as a VOR (Very High Frequency Omnidirectional Range) system. This system includes a ground base transmitter broadcasting from a rotating directional antenna a carrier wave amplitude modulated (AM) by a subcarrier. The subcarrier is frequency modulated (FM) to provide a reference signal which is compared in phase with the signal resulting from the amplitude modulation of the carrier by the rotating antenna. The resulting phase difference is a measure of the bearing angle of an aircraft mounted receiver to or from the ground base transmitter.

Ground base transmitting stations, commonly known as OMNI stations, for the VOR navigational system are positioned at various geographic locations to provide the navigational aid for aircraft flying in the vicinity of such geographic locations. Each station broadcasts a radio signal comprising a main carrier, to which the aircraft receiver is tuned. The main carrier is space amplitude modulated (AM) by a 30 Hz sine wave. When the beam traverses magnetic north at the OMNI station, the sine wave is at the peak of the sine wave. This 30 Hz sine wave is referred to as the directional (vairable) component or signal.

Also broadcast by each OMNI station is a signal having a 9960 Hz subcarrier, which is frequency modulated (FM) by a 30 Hz wave. This sine wave is referred to as the reference component or signal.

In operation, both the reference signal and the variable signal are in phase, both at the same zero crossing level, when the station's beam traverses magnetic north. As the rotating broadcast beam moves angularly farther away from magnetic north, there is an increasing difference in the phase between the reference signal and the variable signal. This difference in phase is thus directly proportional to the angular rotation in degrees that the beam has rotated from magnetic north.

When both the variable signal and the reference signal are received at an aircraft flying in the vicinity of an OMNI station, the bearing between the station and the aircraft will correspond to the phase difference between these two signals. Conventional aircraft receivers for the VOR system include a phase difference detector coupled to a null meter and a dial which is manipulated by an operator to obtain a reading on the dial of the difference in phase between the reference signal and the variable signal. A readout is then obtained from the calibration on the dial at the time the meter is centered.

It is known that if harmonic distortion is present on one or both of the reference or variable signals, then the difference in phase between the two waves may vary and although a phase measurement between the two signals may be made with the required accuracy and stability, an error will inevitably result. In practice, it is generally assumed that the reference signal is substantially free of harmonic distortion and only harmonic distortion of the variable signal need be considered. One method of overcoming the problems presented by the presence of harmonic distortion on the variable signal is to supply a suitable filter and zero detector in both the reference and the variable signal channels. The two channels must be phase matched to a high degree if reasonable circuit stability is to be maintained. This solution is feasible to the extent that suitably matched components can be provided for operation over the required temperature range, but there is the possibility that linear drift may present a problem as great as that created by harmonic distortion.

A feature of the present invention is to provide a VOR system monitor for evaluating the phase error between a reference and a variable signal. Another feature of the present invention is to provide a VOR system monitor for minimizing phase error due to a harmonic distortion component. Still another feature of the present invention is to provide a VOR system monitor for reducing periodic noise at close to even harmonic multiples of the reference signal and variable signal.

In accordance with the present invention, an aircraft navigation receiver monitor, where first and second signals of a given frequency are received from a navigation system, includes a first network for changing the frequency of the first signal by a predetermined factor and generate a first error signal. A second network changes the frequency of the second signal by a predetermined factor and a programmable delay response to the changed frequency of the second network for phase delaying the changed frequency signal and generate a second error signal. A comparator receives the first and second error signals and compares the phase of the first signal with the phase of the second signal and generates an alarm when the phase difference exceeds a preset limit.

A more complete understanding of the invention and its advantages will be had by reference to the following description taken in conjunction with the accompanying drawings.

Referring to the Drawings.

As explained, the primary means by which aircraft traveling throughout the various international and domestic air routes are continually informed of their bearing is by means of the VOR navigation system. This system employs a reference FM radio signal modulated at 30 Hz which is received by an aircraft. The VOR field station also transmits a continuous wave radio signal from a rotating directional antenna such that a 30 Hz AM signal is produced in space and available to a receiving aircraft. The phase of the modulation of the FM signal is constant for all bearing angles relative to the field station. However, the AM signal has an identifiable phase for each degree of bearing away from a reference bearing chosen for the field station; usually the reference bearing is due north. An aircraft receiving both the AM and FM signals at a VHF receiver processes the signals in a phase detector which detects the phase difference between the 30 Hz modulation carried by the AM and FM signals. This phase difference is measured in degrees and is a direct indication of the bearing of the aircraft relative to the reference position of the VOR field station.

Figure 1:
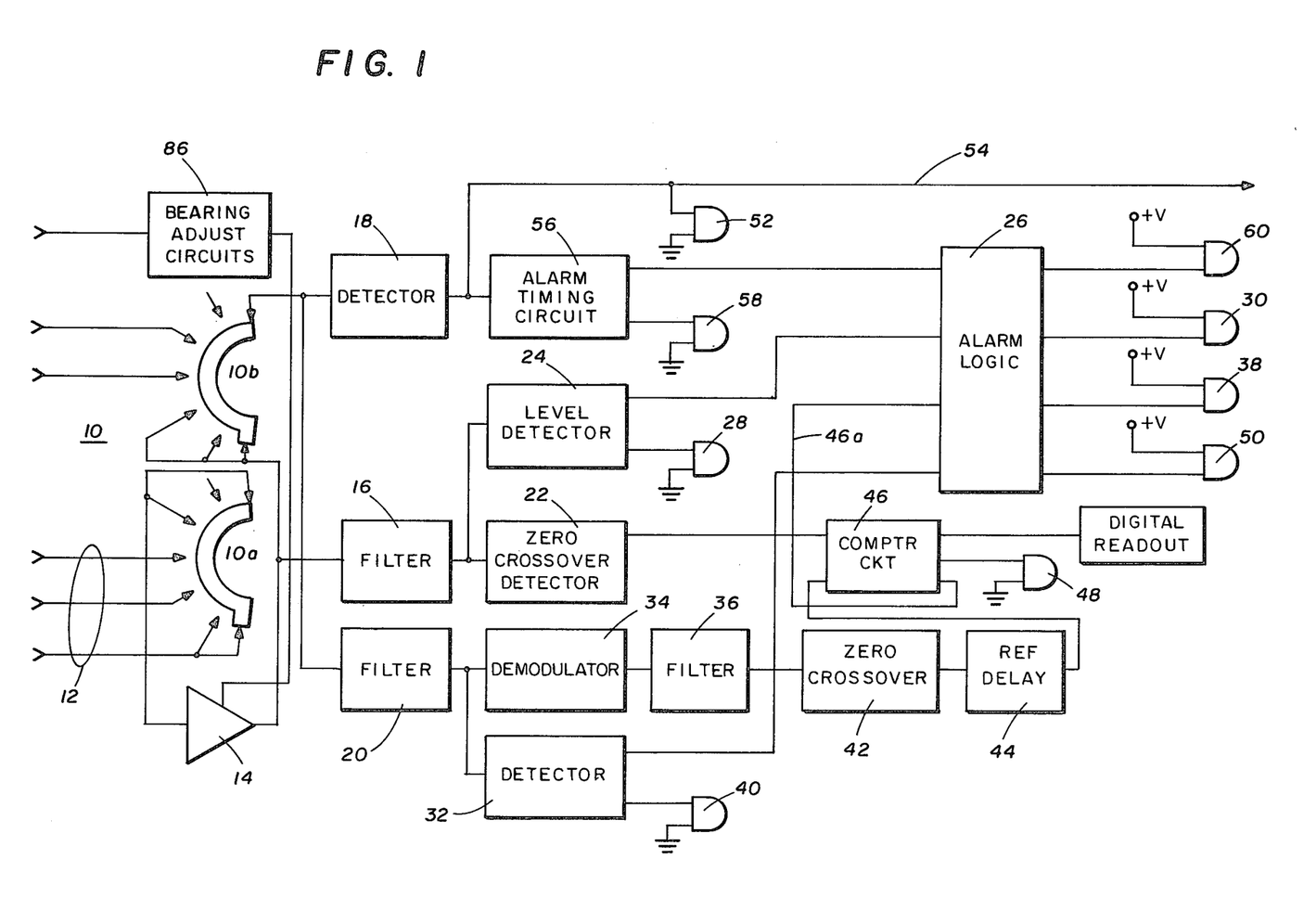
FIG. 1 is a block diagram of a monitor for providing a continual check of four parameters of a VOR navigation receiver.

Referring to FIG. 1, a VHF receiver (not shown) tuned to the frequency of a VOR field station produces the conventional composite signal at its output including the variable phase signal at 30 Hz AM modulation and the reference phase signal at 30 Hz FM modulation of a standard 9960 Hz subcarrier. These signals from the VHF receiver are applied to a two stage wafer switch 10 by means of input lines 12. Also received over the lines 12 is an identification code identifying the particular field station transmitting the reference 30 Hz signal and the variable 30 Hz signal.

The composite signal from the VHF receiver is coupled through the wafer 10a to an input amplifier 14 and from the amplifier to the wafer 10b and a 30 Hz filter 16. From the wafer 10b the composite signal is applied to a detector 18 and a 9960 Hz filter 20. Each of the circuits, including the filters 16 and 20 and the detector 18, is designed to isolate specific components of the composite VOR field signal in order to monitor parameters of the VOR receiver.

The composite signal from the amplifier 14 is passed through the low pass filter 16 which eliminates the subcarrier to produce a 30 Hz variable phase signal. This filtered variable 30 Hz component is applied to both a 30 Hz zero crossover detector 22 and a 30 Hz peak level detector 24. An output from the 30 Hz peak level detector 24 is applied to alarm logic 26 ultilized to control the alarm limits of the 30 Hz modulation. When the variable 30 Hz modulation level is normal a status indicator 28 is activated and when the modulation level varies from normal, as determined within the alarm logic 26, a status indicator 30 is activated.

Another component of the output of the amplifier 14 is applied through the 9960 Hz filter 20 to a zero crossover detector 32 and a 30 Hz demodulator 34. The latter to isolate the reference 30 Hz component which is applied to a filter 36.

In addition to providing isolation of the 9960 Hz signal to obtain the reference 30 Hz signal in the demodulator 34, the output of the 9960 Hz filter 20 also drives the level detector 32. The 9960 Hz signal from the detector 32 is applied to the alarm logic 26 for a comparison to a preset reference. If the 9960 Hz signal level drops below the preset level, a status indicator 38 is activated. For normal levels of the 9960 Hz signal, one output of the detector 32 drives a status indicator 40.

The 30 Hz reference signal from the filter 36 is applied through a zero crossover detector 42 and to a reference delay 44. A 30 Hz reference signal from the delay 44 and a 30 Hz variable signal from the detector 22 are applied to a comparator circuit 46 for a comparison of the phase difference between these two signals. For a normal bearing error, the comparator circuit activates a status indicator 48. If the bearing error exceeds a preset limit, as established in the alarm logic 26, an output of the comparator circuit 46, as applied to the logic 26 by means of a line 46a, activates a status indicator 50. The bearing error is also displayed on a digital error readout. Typically, the alarm logic 26 activates the status indicator 50 if the phase error between the reference signal and the variable signal exceeds plus or minus one degree nominal; however, this alarm limit is variable.

The output of the amplifier 14, as routed through the wafer switch 10b, is also applied to the detector 18 for isolating a 1020 Hz component identification code from a composite signal. The detector 18 decodes the identification signal from the composite signal to drive a status indicator 52 and provide a signal on a line 54 to other identification circuitry (not shown) of the VOR receiver. Also connected to the output of the detector 18 is an alarm timing circuit 56 that drives a status indicator 58 and provides a signal to the alarm logic 26 wherein the identification signal level is compared to a reference level. If the identification code is absent for more than a preset time interval, the alarm logic 26 activates a status indicator 60.

Figure 2A:
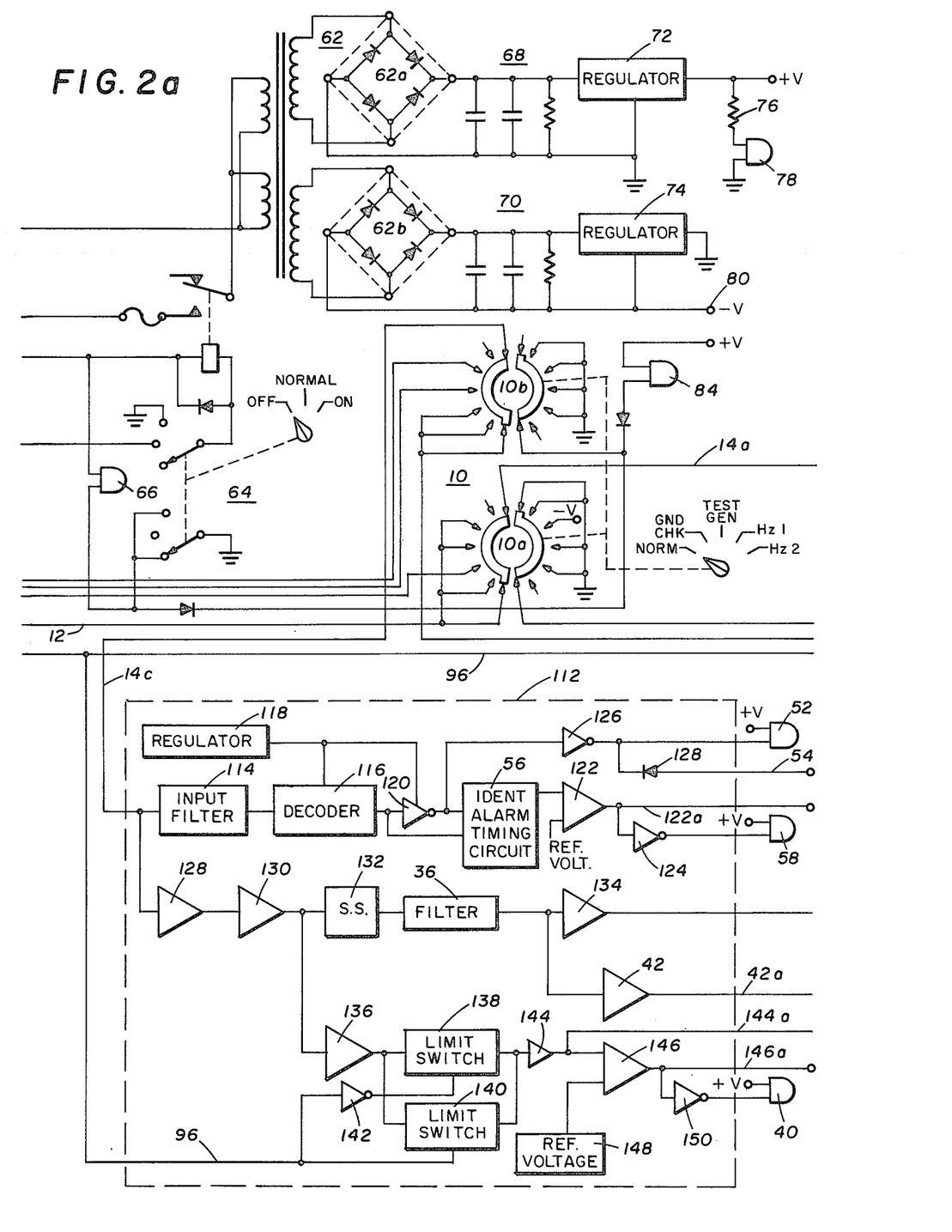
FIGS. 2a, 2b, and 2c are an extended block diagram, logic schematic of the monitor of FIG. 1 for providing a continual check of the phase error between a reference signal and a variable signal.
Figure 2B:
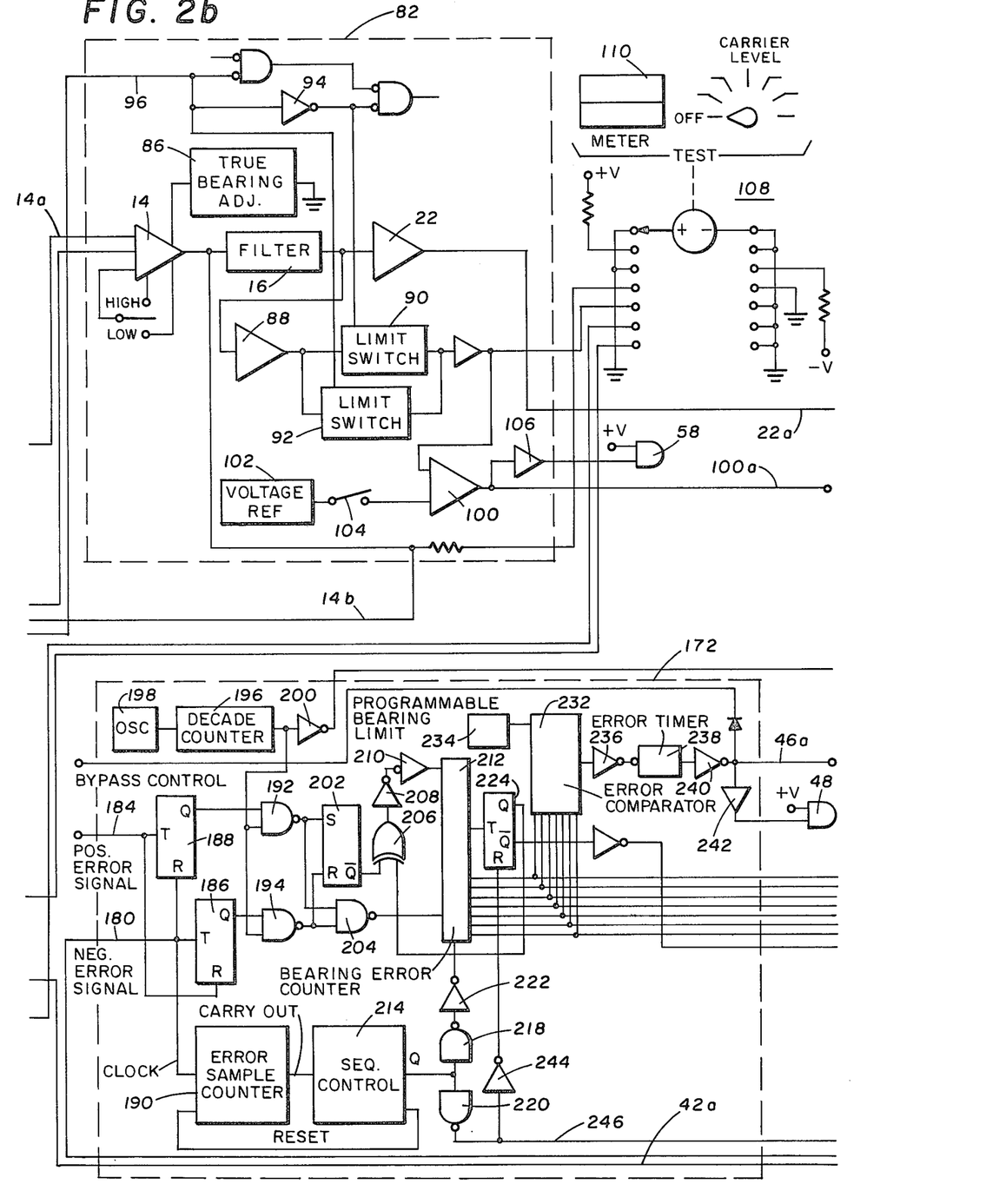
Figure 2C:
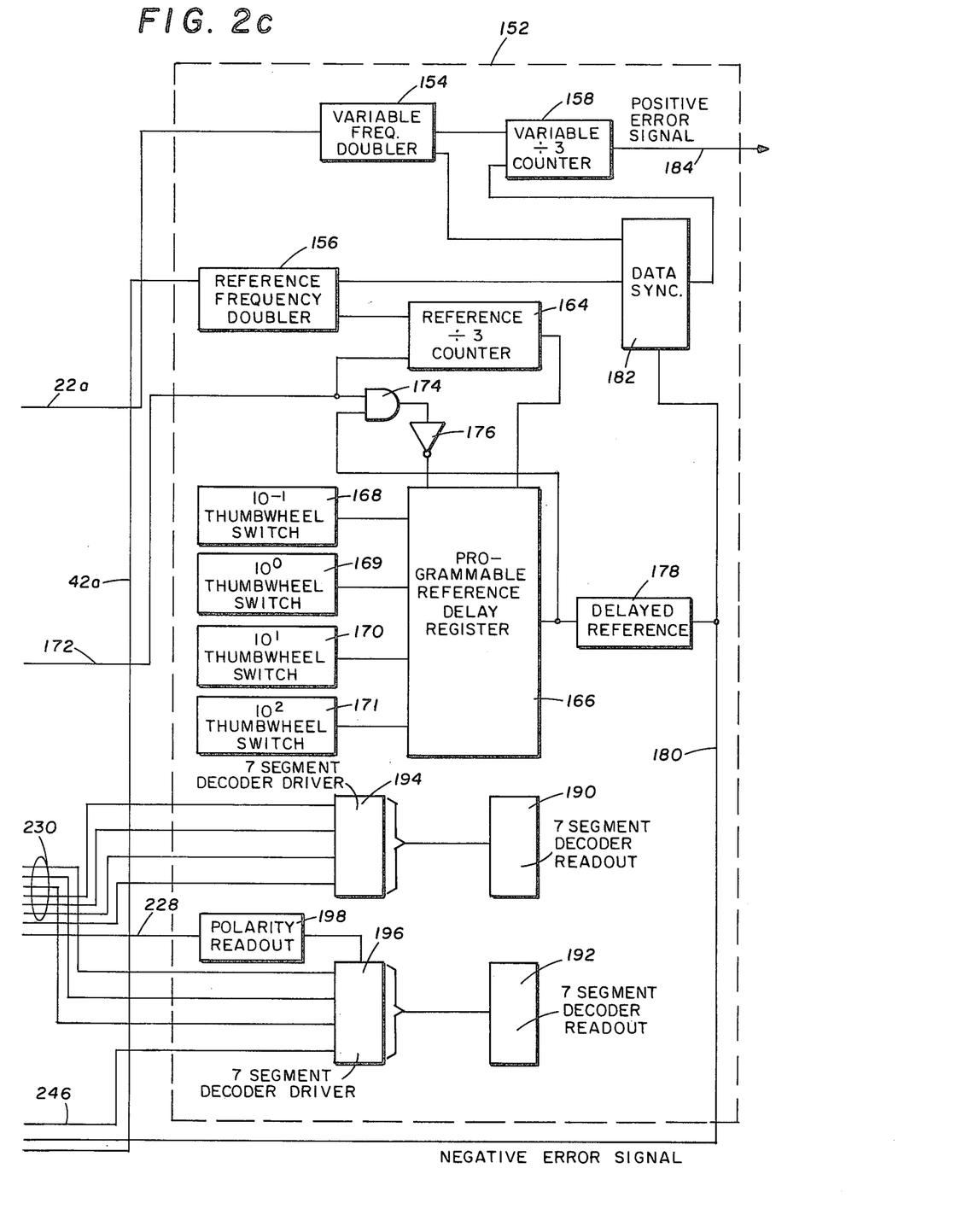
Figure 3:
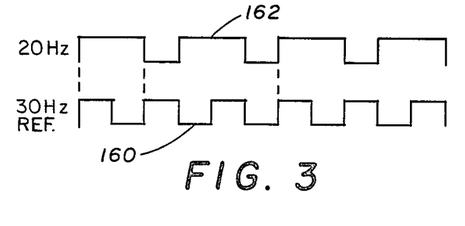
FIG. 3 illustrates a changed frequency waveform as generated by the circuit of FIG. 2c.

Referring to FIGS. 2a, 2b and 2c, regulated supply voltages for the circuitry shown are provided by a diode bridge rectifier power supply 62 controlled by a two-pole, three-position switch 64. A status indicator 66 identifies the position of the switch 64. Rectified voltages from the diode bridges 62a and 62b are applied to filters 68 and 70, respectively, and to conventional regulator circuitry 72 and 74. An output of the regulator 72 provides positive DC voltages for the circuitry and is coupled through a resistor 76 to a power on indicator 78. An output of the regulator 74, at a terminal 80, provides regulated negative DC voltages.

The composite signal on the line 12 is connected to the wafer 10a of the wafer switch 10 and by means of a line 14a to the amplifier 14 of a variable signal circuit 82. An output of the amplifier 14 is applied by means of a line 14b to the wafer 10b of the wafer switch 10. Also connected to the wafer 10b is a monitor bypass indicator 84 that is energized when the monitor of the present invention is not utilized during the operation of the VOR receiver.

With reference to the variable signal circuit 82, this circuitry processes the output of the amplifier 14 to separate the variable 30 Hz signal component and adjust the 30 Hz modulation alarm level. An adjustment for the true bearing is input to the amplifier 14 by means of a true bearing controller 86.

As explained, an output of the amplifier 14 is applied to a filter 16 and from the filter 16 to the zero crossover detector 22 and from the detector 22 by means of a line 22a to reference delay circuit 152. An output of the filter 16 is also applied to a peak detector amplifier 88 as part of the level detector 24. The output of the peak detector amplifier 88 is applied to limit switches 90 and 92 with the limit switch 90 actuated by a control signal at the output of an inverter amplifier 94 and the limit switch 92 under control of a signal on a line 96.

Either one or the other of the limit switches 90 and 92 is energized to apply the output of the amplifier 88 through a buffer amplifier 98 to the input of a level detector amplifier 100. A second input to the level detector amplifier 100 is a reference voltage from a supply 102 through a control switch 104. An output of the level detector amplifier 100 is applied through a lamp driver amplifier 106 to the status indicator 58. When a normal condition exists for the 30 Hz variable signal, as determined by the reference supply 102, an output of the amplifier 100 is coupled by means of a line 100a to the alarm logic 26.

Also coupled to the output of the buffer amplifier 98 is an analog test meter 108 that provides to an operator, by means of a meter 110, an analog indication of the voltage level of the variable 30 Hz signal.

The output from the amplifier 14 on the line 14b is routed through the wafer 10b on a line 14c to a reference signal circuit 112. Within the circuit 112, the output of the amplifier 14 is applied to the 1020 Hz detector 18 comprising an input filter 114, a decoder 116, a regulator 118 and an inverter amplifier 120. The regulator 118 supplies operating voltages to the decoder and to the inverter amplifier 120. The output of the filter 114 is applied to the tone decoder 116, typically a phase lock loop tone decoder. At the output of the tone decoder 116 there is generated a logic signal which goes low when the identification code is present and goes to a logic high level when it is absent. This signal is applied to the timing circuit 56 which activates an alarm if the output of the decoder 116 is at a logic high or logic low level for longer than a preset time.

The alarm timing circuit 56 includes two delay circuits interconnected in series. The combination of the two delays provides the timing interval during which the identification code should be present. An output from the timing circuit 56 is applied through a level detector 122 having a reference voltage applied to a second input terminal. The level detector 122 produces an output to the alarm logic 26 on the line 122a and an input to a lamp driver 124 connected to the status indicator 58.

Coupled to the output of the inverter amplifier 120 is a lamp driver amplifier 126 to drive the status indicator 52 and provide an identification code signal on the line 54 through a diode 128.

Also connected to the line 14c is the filter 20 comprising a filter amplifier 128 having an output applied to a zero crossover detector 130. The zero crossover detector 130 serves to provide a 9960 Hz square wave which is applied to a single shot multivibrator 132 functioning as the demodulator 34 designed to isolate the reference 30 Hz FM signal component as frequency modulated on the 9960 Hz subcarrier. An output from the single shot multivibrator 132 is coupled to the 30 Hz filter 36 to further isolate the 30 Hz reference signal.

From the filter 36, the 30 Hz reference signal is applied to a peak level detector 134 and to the 30 Hz zero crossover detector 42. An output of the peak level detector 134 is applied to the test meter 108 to give an analog indication on the meter 110 of the level of the 30 Hz reference signal. An output of the zero crossover detector 42 is applied to the reference delay 44 over the line 42a.

The output of the zero crossover detector 130 is also applied to the detector 32 comprising a 9960 Hz peak detector amplifier 136 having an output coupled to limit switches 138 and 140. These limit switches are actuated by a control signal on the line 96 with the control signal to the limit switch 138 inverted in an amplifier 142. An output of the detector amplifier 136 is transmitted through one of the limit switches 138 or 140 and applied to a buffer amplifier 144 having an output connected to a 9960 Hz level detector amplifier 146. The amplifier 146 has a second input from a reference voltage supply 148 and generates a signal on a line 146a to the alarm logic 26. An output of the amplifier 146 is also applied to a lamp driver 150 for energizing the status indicator 40.

Operationally, the 9960 Hz peak detector 136 and associated circuitry is identical to the 30 Hz peak detector 88 and circuitry associated therewith. An output of the buffer amplifier 144 is also applied to the test meter 108 to give an analog level indication on the meter 110 of the level of the 30 Hz reference signal.

Referring to FIG. 2c, and output of the 30 Hz zero crossover detector 22 on the line 22a and the output of the 30 Hz zero crossover detector 42 on the line 42a is applied to the reference delay circuit 152. The primary purpose of this circuit is to convert the 30 Hz reference signal and the 30 Hz variable signal into 20 Hz negative and positive error signals, respectively, and to delay the 30 Hz reference signal. In addition, the reference delay circuit 152 provides a digital readout of the bearing error. By operation of the reference delay circuit 152, harmonic distortion and periodic noise signals are minimized in the evaluation of a bearing signal.

One of the primary inputs to the circuit 152 is the 30 Hz variable signal applied to a variable frequency doubler 154. The second primary input to the circuit is the 30 Hz reference signal applied to a frequency doubler 156. The 30 Hz reference signal has the same phase at all monitoring points and the 30 Hz variable signal has a phase that varies linearly with respect to the azimuth angle of an aricraft from the field station. Thus, the phase relationship of the 30 Hz variable signal to the 30 Hz reference signal is equal to the monitored radial.

When the zero degree radial is being monitored, that is, when an aircraft is due north of the station, both signals are directly in phase with one another and the phase difference is zero. By comparing the leading edges or trailing edges of the two signals, this phase difference between the signals can be determined. The same comparison as made at the zero degree radial can also be made at any other radial provided that the 30 Hz reference signal is delayed by an amount proportional to the phase difference between the reference signal and the variable signal. This difference is a known quantity and corresponds to the radial location in degrees of the field detector, around the rim of the counterpoise, with respect to magnetic north.

To minimize the noise interference normally experienced with VOR navigation system, such as 60 Hz line interference and second harmonic generation, the 30 Hz reference signal is applied to the frequency doubler 156 and the 30 Hz variable signal is applied to the frequency doubler 154. At the output of the variable frequency doubler 154 there is generated a 60 Hz signal applied to a variable divide-by-three counter 158. The output of the divide-by-three counter 158 is a positive error signal at a 20 Hz frequency.

Figure 4:
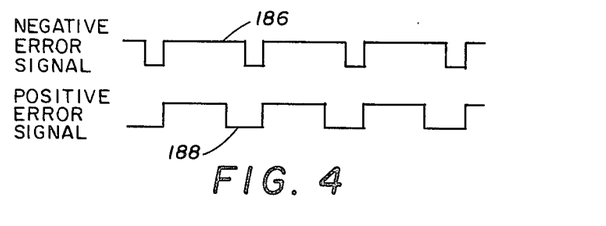
FIG. 4 illustrates the waveform of the positive error signal and the negative error signal generated by the outputs of the circuit of FIG. 2c.

Referring to FIG. 4, the frequency doubler 154 and the divide-by-three counter 158 preserve the appropriate leading edges of the 30 Hz signal as illustrated by the waveform 160 and the 20 Hz error signal as illustrated by the waveform 162.

Similarly, the output of the reference frequency doubler 156 is a 60 Hz signal applied to a reference divide-by-three counter 164 providing a 20 Hz square wave output to a programmable reference delay 166.

In order to be able to monitor any radial, the leading edges of the 20 Hz output signal from the reference divide-by-three counter 164 are shifted by means of the programmable delay register 166 by an angle equal to the radial being monitored. The radial in degrees corresponds to the location of the field station with respect to a receiving aircraft. This radial is entered into the programmable delay register 166 by means of thumb wheel switches 168 through 171 that individually provide binary coded delay data.

Bearing data from the thumb wheel switches 168 through 171 is entered in binary coded decimal form into the programmable delay register 166 that includes four programmable counters. The programmable counters receive clock pulses on a line 172 through a NAND gate 174 and an inverter 176. The clock input to the programmable counter is a 108 KHz square wave. When the counter reaches the phase delay as set by the thumb wheel switches 168–171 the output of the reference divide-by-three counter 164 is applied to a reference signal shot multivibrator 178.

As an example of the operation of the programmable register 166, if the receiving aircraft is flying on a magnetic north heading the thumb wheel switches 168 through 171 are set at zero, then, there would be no delay since the countdown would be zero. If the receiving aircraft were then flying 180 degrees from magnetic north, the programmable counters of the register 166, in response to the clock pulses from the inverter 176, would count down from 1800 as set by the thumb wheel switches 168 through 171, each count representing 0.1°.

Also clocked by the pulses on the line 172 is the reference divide-by-three counter 164. This counter is configured to divide a 60 Hz input signal from the doubler 156 by a factor of three in response to the clock pulses on the line 172.

An output from the reference single shot multivibrator 178 is a negative error signal on a line 180 that is also applied to a data synchronizer 182. The data synchronizer 182 responds to the frequency signal from the doublers 154 and 156 and generates an output to clock the variable divide-by-three counter 158. This insures that the positive error signal on the line 184 and the negative line signal on the line 180 are in phase and not 180 degrees out of phase. Theoretically, the positive error signal on the line 184 and the negative error signal on the line 180 should be in phase; however, there will generally always be some variation.

Referring to FIG. 4, there is illustrated by the waveform 186 the negative error signal on the line 180 and by the waveform 188 the positive error signal on the line 184. The phase difference between these signals is evaluated in a data comparator that provides binary codes to drive a digital readout of the bearing error in seven segment recorder readouts 190 and 192. The readout 190 is driven from a decoder driver 194 and the readout 192 is driven by decoder driver 196, the latter also receiving an input from a polarity readout detector 198.

Referring to FIG. 2b, the negative error signal on the line 180 is applied to the T-terminal of a flip-flop 186, the reset terminal of a flip-flop 188 and as a clock pulse to an error sample counter 190. Applied to the T-terminal of the flip-flop 188 is the positive error signal on the line 184, and this signal is also applied to the reset terminal of the flip-flop 186. An output of the flip-flop 188 is applied to a NAND gate 192 and an output of the flip-flop 186 is applied to a NAND gate 194. Each of these gates is also clocked by the output of a decade counter 196 connected to a crystal oscillator 198 that produces a 1.08 MHz square wave which is divided by 10 in the counter 196 to produce the 108 KHz clock output to the gates 192 and 194 and also the clock pulses to the circuit 152 on the line 172 through an inverter 200.

Each of the NAND gates 192 and 194 is connected to an error flip-flop 202 and to a NAND gate 204. The $\overline{Q}$ terminal of the flip-flop 202 is tied to one terminal of an exclusive OR gate 206 having an output twice inverted by means of inverters 208 and 210 before coupling to a bearing error counter 212. Also connected to the bearing error counter is the output of the NAND gate 204.

A carryout pulse from the error sample counter 190 is applied to a sequence controller 214 generating a reset pulse to the counter 190 over a line 216 and generating a second output applied to NAND gates 218 and 220. An output of the NAND gate 218 is inverted in an inverter 222 and applied to the reset terminal of the bearing error counter 212.

The bearing error counter 212 consists of four counters interconnected to average the count from the NAND gates 192 and 194 for 100 cycles as controlled by the second output of the sequence controller 214. One of the four counters is identified as a 10's digit counter, and if this counter overflows a trigger signal will be generated to an error polarity flip-flop 224 to provide a second input to the exclusive OR gate 206. This modifies the up/down count of the bearing error counter 212 so that the counter will count accordingly. A second output of the error polarity flip-flop 224 identifies the polarity of the bearing error signal by generating the output of the Q terminal that is inverted in an inverter 226 and applied to the polarity readout (FIG. 2c) on a line 228.

Output lines 230 from the bearing error counter 212 carry binary coded data representing a bearing error between the positive error signal and the negative error signal. This binary coded data is applied to the seven segment decoder drivers 194 and 196 to provide a digital readout of the bearing error at the readouts 190 and 192.

This binary coded data from the counter 212 is also applied to an error comparator 232 having an input from a programmable bearing limit 234. This limit can vary from plus or minus 0.1° to 4.9°. When the limit error is set at 1.0 degrees and the bearing error counter 212 reaches a count of one the error comparator circuit 232 is enabled and a signal is applied through an inverter 236 to an error timer single shot multivibrator 238. The single shot multivibrator 238 generates an output through an inverter 240 to a lamp driver amplifier 242 connected to the bearing normal status indicator 48. The output of the inverter 240 is also applied to the alarm logic 26 over the line 46a.

In operation of the phase comparator circuit 172, the positive error signal and the negative error signal are fed into the phase detector comprising the flip-flops 186 and 188 which look at the leading edges of these signals and outputs a pulse at one port if the negative error signal arrives first, and outputs a pulse at another port if the positive error signal arrives first. Both outputs are terminated by the arrival of the other error signal. Therefore, if one error signal leads the other by 1°, the flip-flop 186 or 188 will output a stream of 1° pulses at a rate of 20 Hz, and if the other error signal leads by 1°, the other flip-flop will output a stream of 1° pulses at a rate of 20 Hz at the opposite port. If the two error signals are in phase, but one contains a second harmonic component, the flip-flops 186 and 188 will output pulses on alternating ports at a combined rate of 20 Hz.

These output pulses are applied to a digital up/down counter comprising the bearing error counter 212 through logic including the flip-flop 202. The counter 212 averages 100 pulses by means of the sequence controller 214. Thus, the primary purpose of the phase comparator circuit 172 is to evaluate the negative and positive error signals. In addition, a bearing alarm will be initiated if the count from the bearing error counter 212 exceeds an error limit proportional to plus or minus 1° of deviation.

As previously indicated, the flip-flops 186 and 188 are toggled on a leading edge of the positive and negative error signals with the count cycle as described activated on the leading edge of the first pulse to be applied to either the flip-flop 186 or 188. Whichever pulse is applied first depends on whether the positive error signal is leading the negative error signal. If the positive error pulse leads the negative error pulse, flip-flop 188 is set and gate 192 is enabled. As soon as the negative error pulse arrives the flip-flop 186 is reset; however, since the leading edge of the positive error signal has previously arrived, both flip-flops 186 and 188 are in a reset condition. The reverse is true if the negative error signal leads the positive error signal. Thus, the count cycle is only initiated during the interval between the incoming error pulses.

During the count cycle, if the NAND gate 192 is enabled, the bearing error counter 212 counts up and if the NAND gate 194 is enabled, the counter counts down.

The bearing error counter 212 is reset every 1 second by operation of the error sample counter 190. This circuit allows the count to be averaged over 20 pulses applied to the input of the counter 190. Since the input to the counter is applied at a 20 Hz rate, 20 pulses is equivalent to a 1 second time interval established by the sequence controller 214 and applied to the bearing error counter 212. At the end of the designated count cycle, the first pulse output from the sequence controller 214 is a latch pulse. This latch pulse, which is transmitted every 1 second, is applied through the gate 220 by means of a line 246 to reset the readout counters 190 and 192. The output from the NAND gate 220 also resets the error polarity flip-flop 224 through an inverter 244. A second pulse output from the sequence controller 214 is applied through the NAND gate 218 and the inverter 222 to reset the counters in the bearing error counter 212 to zero, thereby allowing the count cycle to be restarted.

Figure 5:
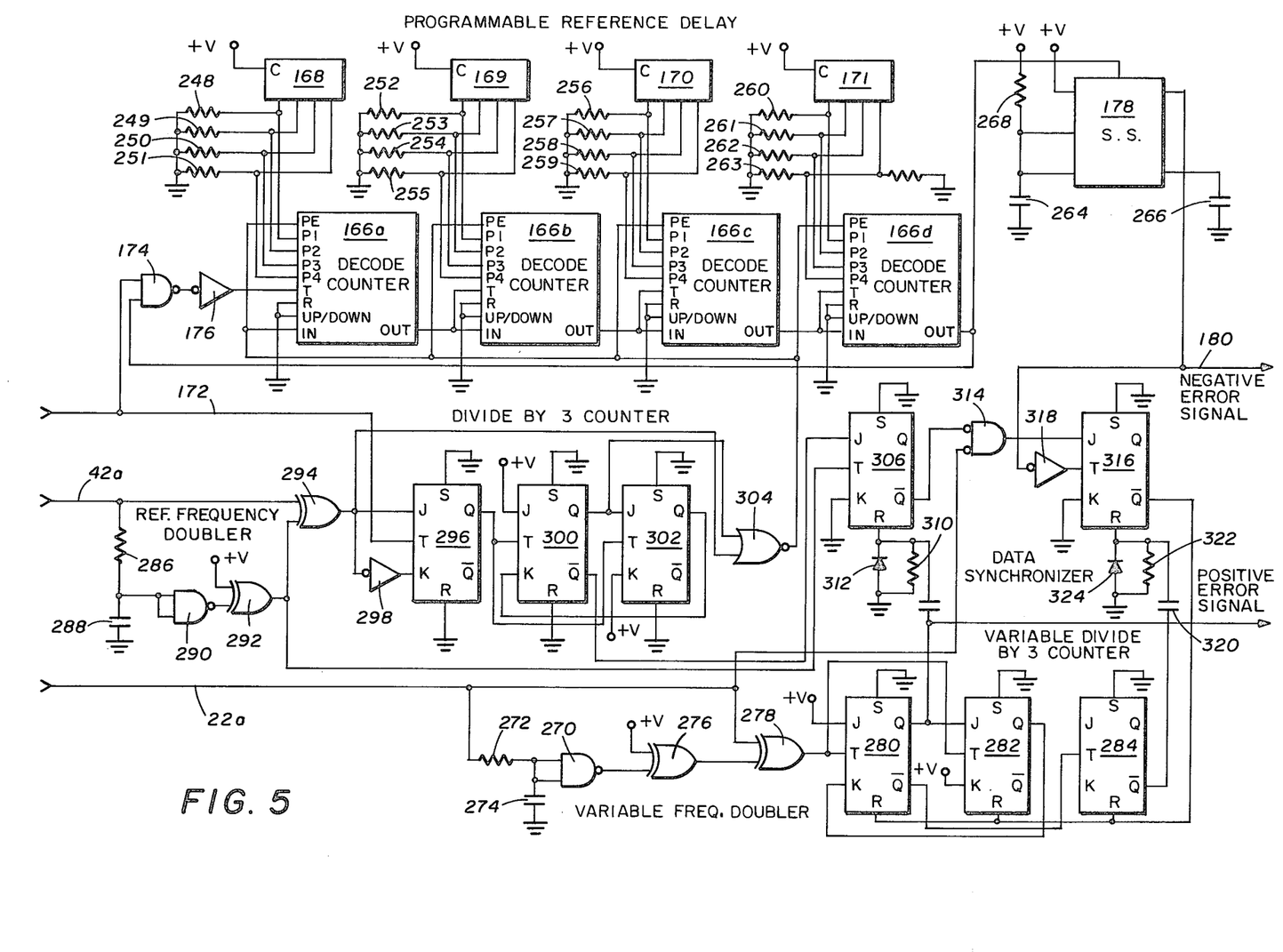
FIG. 5 is a logic schematic of circuitry for generating a negative error signal and a positive error signal for monitoring the phase error between a reference signal and a variable signal.

Referring to FIG. 5, there is shown a detailed logic schematic of the reference delay 152 where the 30 Hz variable signal is input on a line at 22a, the 30 Hz reference signal is input on a line 42a and the 108 KHz clock pulses are input on a line 172. The thumb wheel switches 168 through 171 are individually connected to a positive DC voltage source. The thumb wheel switch 168 connects the voltage source to a resistance network including resistors 248 through 251 to generate a binary code for programming a decode counter 166a as part of the programmable delay register 166. The decode counter 166a receives the 108 KHz clock pulses through the NAND gate 174 and the inverter 176.

An output from the decode counter 166a is an input applied to a decode counter 166b programmed by a binary code from the thumb wheel switch 169. The thumb wheel switch 169 connects the positive voltage source to a resistance network comprising resistors 252 through 255. The binary code for programming the counter 166b is established by voltage levels generated across the resistors 252 through 255.

Similarly, the thumb wheel switch 170 is connected to a resistance network comprising resistors 256 through 259 to generate voltage levels representing a binary code for programming a decode counter 166c. The decode counter 166c steps in response to an output from the decode counter 166b. The count output of the decode counter 166c is an input applied to a decode counter 166d, also forming a part of the programmable reference delay register 166. The decode counter 166d is programmed by a binary code generated across a resistance network comprising resistors 260 through 263 connected to the thumb wheel switch 171.

Voltage pulses at the output of the decode counter 166d are input to the reference single shot multivibrator 178 having a timing cycle established by capacitors 264 and 266, along with a resistor 268. An output of the single shot multivibrator 178 is the negative error signal generated on the line 180. An output from the decode counter 166d is also input to the NAND gate 174 to synchronize the operation of the register 166.

Incoming to the circuit of FIG. 5 is the 30 Hz variable signal on the line 22a as applied to a NAND gate 270 through a timing network including a resistor 272 and a capacitor 274. Logic output pulses from the NAND gate 270 are input to an exclusive OR gate 276 having a second input connected to a positive DC voltage supply. The exclusive OR gate 276 generates an output applied to one input of an exclusive OR gate 278 having a second input receiving the 30 Hz variable signal on the line 22a. The NAND gate 270 and the exclusive OR gates 276 and 278 comprise the variable frequency doubler 154 of FIG. 2c.

The 60 Hz output signal from the exclusive OR gate 278 is applied to the T-terminal of J-K flip-flops 280 and 282. These flip-flops are part of the variable divide-by-three counter 158 that includes a third J-K flip-flop 284 having the T-terminal connected to the Q-terminal of the flip-flop 280. A 20 Hz output signal from the variable divide-by-three counter 158 is generated at the Q-terminal of the flip-flop 280 and is the positive error signal generated on the line 184.

Also applied as an input to the circuit of FIG. 5 is the 30 Hz reference signal on the line 42a routed through a timing circuit including resistor 286 and capacitor 288 to a NAND gate 290 as part of the reference frequency doubler 156. An output of the NAND gate 290 is applied to an exclusive OR gate 292 generating an output to one input of an exclusive OR gate 294 having a second input receiving the 30 Hz reference signal on the line 42a. The exclusive OR gates 292 and 294 also are part of the reference frequency doubler 156.

Logic output pulses from the exclusive OR gate 294 cycle at a 60 Hz rate and are applied to the J-terminal of a J-K flip-flop 296 and also through an inverter 298 to the K-terminal of the flip-flop 296. The Q-terminal of the flip-flop 296 is tied to the T-terminal of J-K flip-flops 300 and 302. The flip-flops 296, 300 and 302 comprise the reference divide-by-three counter 164 of FIG. 2c.

A 20 Hz output from the reference divide-by-three counter 164 is generated at the Q-terminal of the flip-flop 300 and is applied to one input of a NOR gate 304 having a second input connected to the output of the exclusive OR gate 294. The 20 Hz signal from the NOR gate 304 is input to each of the decode counters 166a, 166b, 166c and 166d to preset the count level for comparison with the programmable binary code input from the thumb wheel switches 168 through 171.

Logic pulses generated at the $\overline{Q}$-terminal of the flip-flop 300 are applied to the J-terminal of a J-K flip-flop 306 as part of the data synchronizer 182. The T-terminal of the flip-flop 306 connects to the output of the exclusive OR gate 292 of the reference frequency doubler. A reset signal to the flip-flop 306 is the positive error signal at the Q-terminal of the flip-flop 280 applied to the R-terminal of the flip-flop 306 through a capacitor 308 connected to a resistor 310 in parallel with a diode 312.

An output of the flip-flop 306 at the Q̄-terminal is applied to one input of a NAND gate 314 having a second input responsive to the 30 Hz variable signal on the line 22a. The output of the NAND gate 314 is applied to the J-terminal of a J-K flip-flop 316 responsive to the inverted negative error signal at the output of an inverter 318. The flip-flop 316 is reset by the logic pulses at the Q̄-terminal of the flip-flop 284 through a capacitor 320 connected to a resistor 322 in parallel with a diode 324. The output of the data synchronizer 182 is generated at the Q-terminal of the flip-flop 316 and is applied to the reset terminals of the flip-flops 280, 282 and 284 of the variable divide-by-three counter 158.

Figure 6:
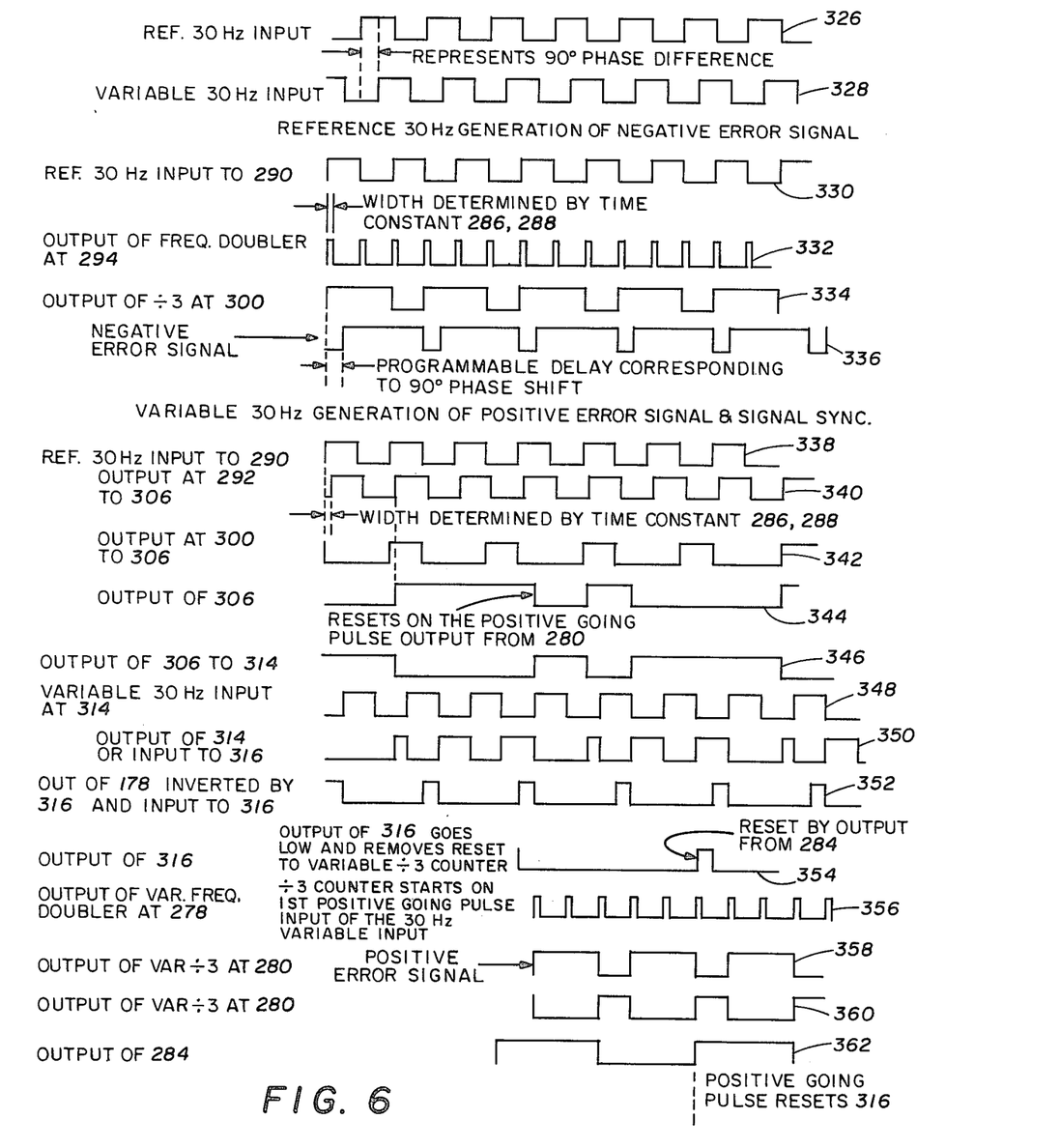
FIG. 6 is a sequence of waveforms illustrating the operation of the circuit of FIG. 5 to generate the error signals for monitoring the phase error between a 30 Hz reference signal and a 30 Hz variable signal.

Referring to FIG. 6, there is shown a series of waveforms illustrating the operation of the programmable reference delay circuit 152. The reference 30 Hz signal is represented by the waveform 326 and the 30 Hz variable signal is represented by the waveform 328 with a 90° phase difference between the reference signal and the variable signal.

To generate the negative error signal, the 30 Hz reference input wave 330 is input to the NAND gate 290 as part of the frequency doubler which generates an output at the exclusive OR gate 294 as illustrated by the waveform 332. The width of the individual pulses of the waveform 332 are determined by the time constant of the network comprising resistor 286 and capacitor 288.

A signal at the output of the exclusive OR gate 294 having the waveform 332 is coupled to the flip-flop 296 of the divide-by-three counter 164 to generate the waveform 334 at the Q-terminal of the flip-flop 300. A signal having the waveform 334 is applied through the OR gate 304 to the decode counters 166a, 166b, 166c and 166d which triggers the single shot multivibrator 178 that generates the waveform 336 as the negative error signal on the line 180.

To generate the positive error signal, the 30 Hz reference signal, as illustrated by the waveform 338 is applied to the NAND gate 290 having an output tied to the exclusive OR gate 292 having an output as illustrated by the waveform 340 applied to the T-terminal or the J-K flip-flop 306. The delay between the leading edges of the waveforms 338 and 340 is determined by the time constant of the network comprising the resistor 286 in series with the capacitor 288.

Also applied to the flip-flop 306 at the J-terminal is a signal from the flip-flop 300 having the waveform 342. At the Q-terminal of the flip-flop 306 a voltage is generated having the waveform 344 with the flip-flop 306 reset on the positive going pulse generated at the Q-terminal of the flip-flop 280 of the variable divide-by-three counter 158.

An output from the flip-flop 306 at the Q̄-terminal is illustrated by the waveform 346 and is input to the NAND gate 314. A second input to the NAND gate 314 is the 30 Hz variable signal having the waveform 348 with the NAND gate 314 combining the waveforms 346 and 348 to generate at the output terminal a pulse train as illustrated by the waveform 350, which is input to the J-K flip-flop 316. Also input to the J-K flip-flop 316 is the inverted output of the single shot multivibrator 178 through the inverter 318. This input to the J-K flip-flop 316 is illustrated by the waveform 352, which is the waveform 336 inverted by the inverter 318. An output from the flip-flop 316 at the Q̄-terminal is illustrated by the waveform 354 with the flip-flop 316 reset at the leading edge of a pulse at the ouput of the flip-flop 284.

The 30 Hz variable signal is also applied to the variable frequency doubler 158 that generates at the output of the exclusive OR gate 278 the waveform 356 at a 60 Hz repetition rate. This signal is applied to the T-terminal of the J-K flip-flop 280 that generates at the Q-terminal the positive error signal on the line 184. The positive error signal is shown by the waveform 358.

The inverse of the positive error signal, as illustrated by the waveform 360, is generated at the Q̄-terminal of the flip-flop 280, which is applied to the T-terminal of the flip-flop 284 to produce reset pulses as shown by the waveform 362 applied to the J-K flip-flop 316.

The waveforms of FIG. 6 shown below the waveform 338 illustrate the operation of the divide-by-three counter 164, the data synchronizer 182, and the divide-by-three counter 158 to generate the positive error signal on the line 184. By operation of the data synchronizer 182, in conjunction with the divide-by-three counters 158 and 164, it is ensure that the signals being compared are in phase and not 180° out of phase.

The positive error signal as shown by the waveform 358 and the negative error signal as shown by the waveform 336 are theoretically in phase and applied to the comparator circuit 152 to generate an alarm when the bearing error exceeds a preset limit. The phase comparator circuit 152 also compares the phase difference between the positive and negative error signals to generate a digital readout of the bearing error in the seven segment decoder readouts 190 and 192.

While only one embodiment of the invention, together with modifications thereof has been described in detail herein and shown in the accompanying drawings, it will be evident that various further modifications are possible without departing from the scope of the invention.

What is claimed is:

1. An aircraft navigation receiver monitor where first and second signals of given frequency are received from a field station, comprising:
    first means for changing the frequency of the first signal by a predetermined factor to generate a first signal,
    second means for changing the frequency of the second signal by a predetermined factor,
    a programmable delay responsive to the changed frequency of the second means for phase delaying the changed frequency and generating a second signal, and
    means for comparing the phase of the first signal with the phase of the second signal and generating an alarm when the phase difference exceeds a preset limit.

2. An aircraft navigation receiver monitor as set forth in claim 1 wherein the programmable delay includes means for setting the phase delay to correspond to the bearing of the aircraft relative to a reference position.

3. An aircraft navigation receiver monitor as set forth in claim 1 including means responsive to the changed frequency of said first and second means to monitor an out of phase condition between the changed frequencies and generate a disabling signal to inhibit said first signal.

4. An aircraft navigation receiver monitor as set forth in claim 1 wherein said first means for changing includes a frequency doubler responsive to the first signal and a divide-by-three counter connected to said frequency doubler and generating the first signal.

5. An aircraft navigation receiver monitor as set forth in claim 4 wherein said second means for changing includes a frequency doubler responsive to the second signal and a divide-by-three counter connected to said frequency doubler and generating a signal to said programmable delay.

6. An aircraft navigation receiver monitor as set forth in claim 1 wherein said means for comparing includes a digital readout of the bearing error between the first and second error signals.

7. An aircraft navigation receiver monitor as set forth in claim 1 wherein said means for comparing includes a comparator means generating a normal bearing signal when the phase difference between the first and second signals is within the preset limit.

8. An aircraft navigation receiver monitor as set forth in claim 7 including means responsive to the bearing normal signal for indicating a normal phase difference between the first and second signals.

9. An aircraft navigation receiver monitor where first and second signals of given frequency are received from a field station, comprising:
  means responsive to the first and second signals to change the frequency thereof and generate first and second signals at the changed frequency, said means including a programmable delay to introduce a phase delay to the second signal, and
  means for comparing the phase of the first signal with the phase of the second signal and generating an alarm when the phase difference exceeds a preset limit.

10. An aircraft navigation receiver monitor as set forth in claim 9 wherein said means for comparing includes:
  means responsive to the first and second signals to accumulate clock pulses during a time interval varying with the phase difference between the first and second signals, and
  means responsive to the accumulated clock pulses to generate the alarm when the number of accumulated pulses exceeds a preset limit.

11. An aircraft navigation receiver monitor as set forth in claim 10 wherein said means for comparing includes:
  a pulse counter,
  first gating means connected to a source of clock pulses and enabled by the first signal to gate clock pulses to said pulse counter, said first gating means reset by the second signal,
  second gating means connected to the source of clock pulses and enabled by the second signal to gate clock pulses to said pulse counter, said second gating means reset by the first signal, and
  means responsive to the accumulated clock pulses to generate the alarm when the number of accumulated pulses exceeds a preset limit.

12. An aircraft navigation receiver monitor as set forth in claim 11 including sample counter means responsive to the first signal and generating a reset pulse to said pulse counter after a predetermined number of cycles of said first signal.

13. An aircraft navigation receiver monitor as set forth in claim 10 including means responsive to the accumulated clock pulses to generate a numerical display varying with the phase difference between the first and second signals.

* * * * *